United States Patent [19]

Suzuki et al.

[11] Patent Number: 4,503,956
[45] Date of Patent: Mar. 12, 1985

[54] LOCK-UP CONTROL DEVICE AND METHOD FOR LOCK-UP TYPE AUTOMATIC TRANSMISSION

[75] Inventors: Tadashi Suzuki; Yoshiro Morimoto; Hideo Hamada, all of Yokosuka; Masaaki Suga; Takashi Murasugi, both of Yokohama, all of Japan

[73] Assignee: Nissan Motor Company, Limited, Yokohama, Japan

[21] Appl. No.: 419,630

[22] Filed: Sep. 20, 1982

[30] Foreign Application Priority Data

Sep. 21, 1981 [JP] Japan ................. 56-149261

[51] Int. Cl.³ ............................................. B60K 41/28
[52] U.S. Cl. .................................. 192/3.31; 192/0.052
[58] Field of Search ............... 192/3.28, 3.29, 3.3, 192/3.31, 0.092, 3.58, 0.033, 103 R, 0.052; 74/866

[56] References Cited

U.S. PATENT DOCUMENTS

| | | | |
|---|---|---|---|
| 3,448,640 | 6/1969 | Nelson | 74/866 |
| 3,805,640 | 4/1974 | Schneider et al. | 74/866 |
| 4,038,889 | 8/1977 | Lindow et al. | 74/866 |
| 4,056,177 | 11/1977 | Ahlen et al. | 192/3.31 |
| 4,172,505 | 10/1979 | Rabus et al. | 192/0.076 |
| 4,208,929 | 6/1980 | Heino et al. | 192/3.3 |
| 4,270,636 | 6/1981 | Sunohara et al. | 192/3.31 |
| 4,271,939 | 6/1981 | Iwanaga et al. | 192/3.31 |
| 4,294,140 | 10/1981 | Iwanaga et al. | 192/3.31 |
| 4,324,153 | 4/1982 | Sugimoto et al. | 74/866 |
| 4,369,865 | 1/1983 | Sunohara et al. | 192/3.31 |

FOREIGN PATENT DOCUMENTS 1536657 12/1978 United Kingdom .
2030661 4/1980 United Kingdom .

Primary Examiner—George H. Krizmanich
Attorney, Agent, or Firm—Schwartz, Jeffery, Schwaab, Mack, Blumenthal & Koch

[57] ABSTRACT

A lock-up control device in which a pulse train is generated which has a duration which increases as the vehicle speed decreases. A counter generates a period indicative signal indicative of a current period of the pulse train. A memory stores the period indicative signal for a preceding period. An adder generates an adder signal indicative of the addition of a preset value to the period indicative signal stored in the memory. A comparator compares the adder signal with the period indicative signal generated by the counter and generates a comparator signal when the former is larger than the latter. A flip-flop generates a flip-flop signal when the comparator signal occurs under the presence of a lock-up signal. An AND gate provides a lock-up release signal when said flip-flop signal occurs irrespective of the presence of the lock-up signal.

9 Claims, 2 Drawing Figures

LOCK-UP CONTROL DEVICE AND METHOD FOR LOCK-UP TYPE AUTOMATIC TRANSMISSION

BACKGROUND OF THE INVENTION

The present invention relates to a lock-up control device and method for a lock-up type automatic transmission.

In automatic transmissions provided with a torque converter in the power transmission system thereof, the torque converter occasionally permits slippage between the input element thereof (pump impeller) and the output element thereof (turbine runner) and thus causes poor power transmission efficiency and bad fuel economy. Thus, some of the vehicles have adopted a lock-up type automatic transmission wherein the input element of the torque converter is directly connected to the output element thereof during operation of the vehicle in a relatively high vehicle speed operating range and low load operating range wherein the torque multiplication by the torque converter is not required and the variation in the torque of the engine does not create a problem.

A lock-up control device has been described in and in connection with FIG. 2 of copending U.S. application Ser. No. 308,595 entitled "LOCK-UP CONTROL SYSTEM FOR LOCK-UP TYPE AUTOMATIC TRANSMISSION," filed on Oct. 5, 1981, and commonly assigned herewith. In this lock-up control device, there is provided a vehicle speed sensor for generating a pulse train having a period variable depending upon the vehicle speed and a timer for generating clock pulses. A counter counts the number of clock pulses and generates a period indicative decimal signal indicative of the current period of the pulse train. The decimal signal represents the vehicle speed. A lock-up decision circuit including an arithmetic circuit and a memory receives this decimal signal indicative of the vehicle speed and generates a H level lock-up command signal when the vehicle speed is higher than a minimum lock-up vehicle speed which varies depending upon whichever gear ratio is used. When the vehicle speed drops and becomes lower than the minimum lock-up vehicle speed, the level of the lock-up command signal switches to L level. The lock-up command signal is fed to one of the two inputs of an AND gate. A driver is provided which, when the AND gate provides a H level signal, energizes a lock-up solenoid to cause a torque converter to lock up, whereas, when the AND gate provides a L level signal, ceases to energize the lock-up solenoid to release the torque converter from the lock-up state thereof. The level of the signal provided by the AND gate varies depending upon the level of the lock-up command signal as far as a H level signal is fed to the other input of the AND gate. The other input of the AND gate is connected to an $\overline{Q}$ terminal of a flip-flop which is set by the closure of an ignition switch and reset by a H level signal from an abnormality detecting circuit. This circuit maintains the H level of its output as long as the period of the pulse train does not exceed a predetermined time. The output of the circuit switches to a L level only when the period of the pulse train should become longer than the predetermined time, which occurs when the vehicle speed sensor ceases to operate. The flip-flop is set when the ignition switch is closed and keeps generating an H level signal as long as the vehicle speed sensor operates normally. However, when the vehicle speed sensor ceases its operation due to for example, a disconnection or short circuit, the flip-flop is reset and changes its output to L level. Therefore, inasmuch the L level signal is fed to the AND gate from the flip-flop, the AND gate keeps generating a L level signal, ceasing energization of the lock-up solenoid, thus releasing the torque converter from the lock-up state thereof.

With this control device, wherein when the period of the pulse train from the vehicle speed sensor increases and becomes longer than a predetermined period corresponding to the minimum lock-up vehicle speed, there is encountered a drawback that the actual release of the torque converter is delayed to cause the engine to stall when the vehicle is decelerated from the state wherein the torque converter locks up at such a rate as to invite the occurrence of a light wheel lock. The stalling of the engine possibly occurs when disconnection of the electric circuit or short circuit which causes the vehicle speed sensor to generate pulses having excessively long period.

SUMMARY OF THE INVENTION

According to the present invention, there is provided a lock-up control device and method for a lock-up type automatic transmission which is free from the abovementioned problem and prevents the engine from stalling upon rapid deceleration of the vehicle by releasing the torque converter from the lock-up state.

According to the present invention, a lock-up control device comprises:
- means for generating a pulse train having period variable depending upon the vehicle speed;
- means for allowing the torque converter to lock up in response to said pulse train;
- means for generating a period indicative signal indicative of current period of said pulse train;
- memory means for storing said period indicative signal for the succeeding period of the pulse train; and
- means for preventing the torque converter from locking up when a difference between said period indicative signal generated by said period indicative signal generating means and said period indicative signal stored in said memory means is larger than a preset value.

According to the present invention, a lock-up control method comprises:
- generating a pulse train having period variable depending upon the vehicle speed;
- allowing the torque converter to lock up in response to said pulse train;
- generating a period indicative signal indicative of current period of said pulse train;
- storing said period indicative signal for the succeeding period of the pulse train; and
- preventing the torque converter from locking up when a difference between said period indicative signal generated by said period indicative signal generating means and said period indicative signal stored in said memory means is larger than a preset value.

BRIEF DESCRIPTION OF THE DRAWINGS

The present invention is further described along with the accompanying drawings, in which.

DETAILED DESCRIPTION OF THE INVENTION

Throughout the specification, reference will be made to the torque converter "locking up." It will be understood by one of ordinary skill in the art, however, that, more precisely, it is the lock-up clutch of the automatic transmission which, in fact, locks up.

Figure 1:
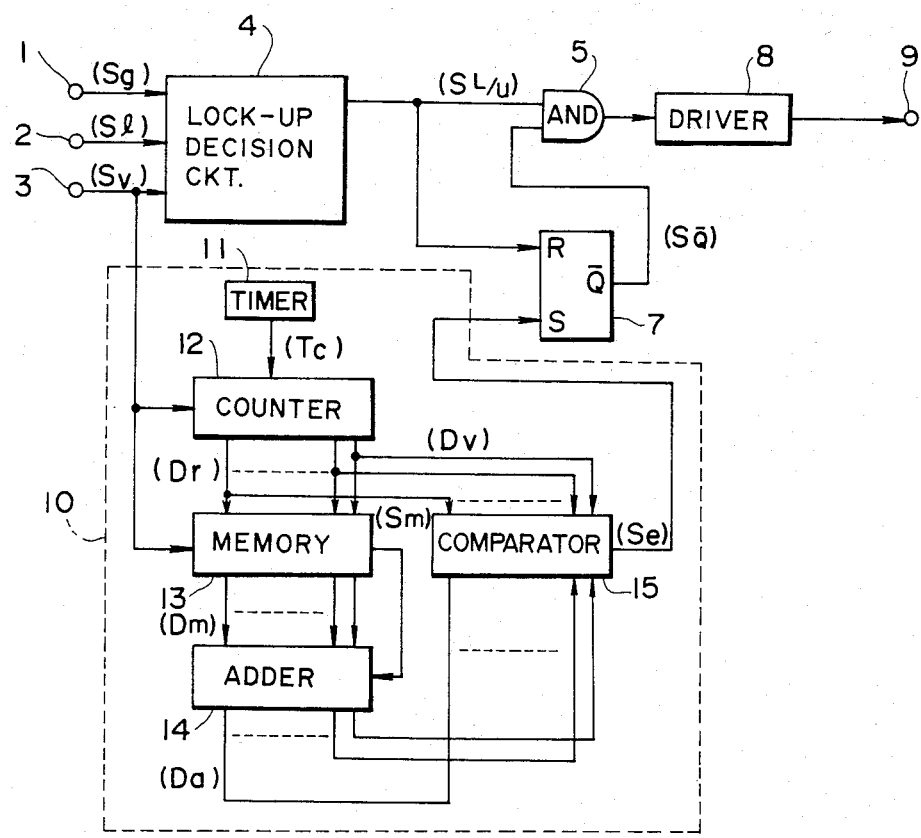
FIG. 1 is a block diagram of a lock-up control device according to the present invention.
Figure 2:
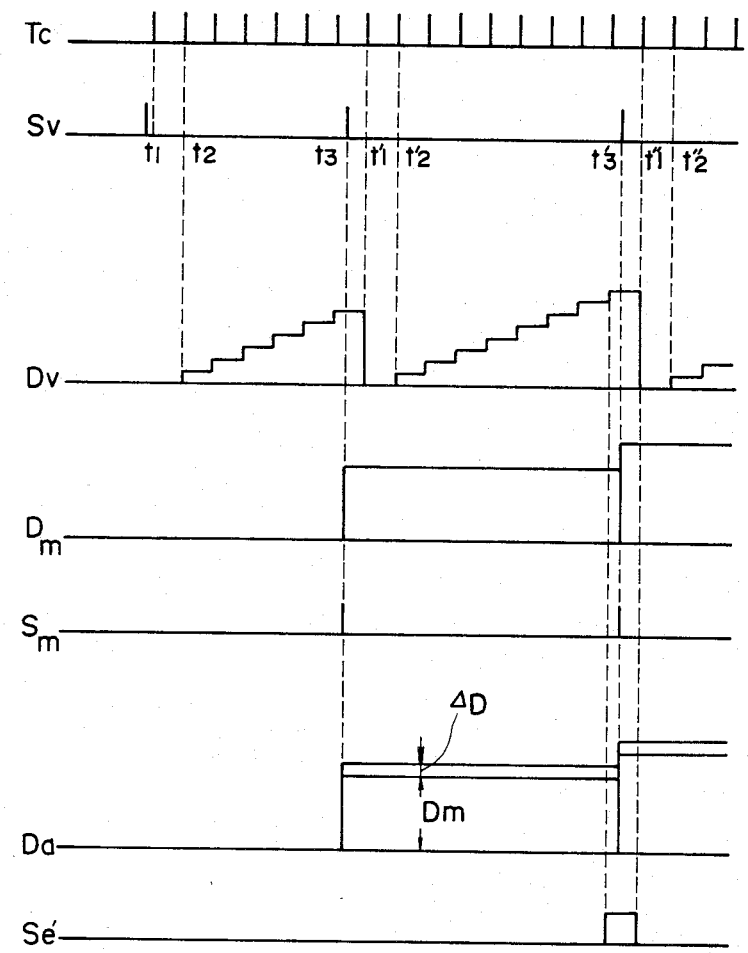
FIG. 2 is a time chart of various signals in this device.

Referring to FIG. 1, a lock-up control device according to the present invention comprises a gear position sensor 1 which is responsive to the positions of shift valves of a hydraulic control system of an automatic transmission and generates a gear position signal Sg indicative of the gear position, an engine load sensor 2 which is responsive to an accelerator pedal and generates an engine load signal S$_l$ indicative of the engine load, a vehicle speed sensor 3 which generates a pulse train Sv having period increasing as the vehicle speed decreases (see FIG. 2). These signals from the sensors are fed to a lock-up decision circuit 4. The lock-up decision circuit 4 detects a running state of the vehicle from the siganls Sg, S$_l$ and Sv fed thereto, and decides whether or not the running state falls in a lock-up range and, if the running state falls in a predetermined lock-up range, supplies a high (H) level lock-up signal S$_{L/U}$ to an AND gate 5, and, if the running state falls outside of the lock-up range, changes the level of the lock-up signal S$_{L/U}$ to a low (L) level.

The lock-up control device also comprises an abnormal period detecting circuit generally denoted by the reference numeral 10. The circuit 10 is fed with the pulse train Sv and supplies a signal Se to a set terminal S of a flip-flop 7. The circuit 7 has a reset terminal R fed with the lock-up signal S$_{L/U}$ and is designed to be set with a rise in the signal Se fed to the set terminal S, while it is reset with a rise in the signal S$_{L/U}$ fed to the reset terminal R. When it is set, the circuit 7 supplies a L level signal S$_{\overline{Q}}$ to an AND gate 5. When it is reset, the flip-flop 7 changes the signal S$_{\overline{Q}}$ supplied to the AND gate 5 to a H level. The AND gate 5 performs a logical multiplication of signals S$_{L/U}$ and S$_{\overline{Q}}$. When the lock-up decision circuit 4 detects the running state of the vehicle which falls in the lock-up range and generates a H level lock-up signal S$_{L/U}$, the flip-flop 7 is reset and generates H level signal S$_{\overline{Q}}$. Therefore, insofar as the level of the signal Se fed to the set terminal S of the circuit 7 remains in L level and keeps the flip-flop 7 in the set state thereof, the AND gate 5 keeps providing the same, in level, signal as the lock-up signal S$_{L/U}$. Therefore, when the vehicle is operating within the lock-up range, the lock-up decision circuit 4 generates H level lock-up signal S$_{L/U}$, causing energization of the lock-up solenoid 9 via the driver 8, thus allowing the torque converter to lock up. On the other hand, when the vehicle enters a running state outside of the lock-up range, the lock-up decision circuit 4 changes the level of the lock-up signal S$_{L/U}$ to L level, denergizing the solenoid 9, thus releasing the torque converter from the lock-up state thereof.

The lock-up decision circuit 4 may comprise a memory 11 and an arithmetic circuit 12 which are described in the above-mentioned copending U.S. application Ser. No. 308,595, the disclosure of which application is hereby incorporated by reference in its entirety. The engine load sensor 2 may comprise an idle switch 70 and a full throttle switch 71 which are described in connection with FIG. 6 of copending U.S. application Ser. No. 280,818 entitled "LOCK-UP CONTROL SYSTEM FOR LOCK-UP TYPE AUTOMATIC TRANSMISSION," filed on July 6, 1981, and commonly assigned herewith, the disclosure of which application is hereby incorporated by reference in its entirety.

Further explanation is made hereinafter of the abnormal period detecting circuit 10. It includes a timer 11, a period indicative signal generating counter 12, a periodic memory 13, an adder 14 and a comparator 15.

The counter 12 is fed with the pulse train Sv generated by the vehicle speed sensor 3 and clock pulses Tc generated by the timer 11. As shown in FIG. 2, the period of the pulse train Sv, viz., the time between the occurrences of the two succeeding pulses, increases as the vehicle speed decreases. Each of the clock pulses Tc appears every predetermined time as shown in FIG. 2. The counter 12 is reset by clock pulses Tc, each appearing right after the occurrence of a pulse of the pulse train Sv at the instances t1, t1' and t1" and is set by the succeeding clock pulses Tc at the instances t2, t2' and t2". When it is set, the counter 12 resumes up-count operation of the clock pulses Tc. The counted value is representative of the current period of the pulse train Sv. The counter 12 generates a decimal period indicative signal Dv indicative of the counted value, viz., the current period of the pulse train Sv.

The periodic memory 13 receives the output decimal signal Dv from the counter 12 and the pulse train Sv. The signal Dv is stored in the memory 13 for the preceding period. Upon receiving the pulse of the pulse train Sv at the instant t3 or t3' (see FIG. 2), the memory is cleared and holds the content thereof. At the same time, it generates a decimal output signal Dm indicative of that content stored therein and a signal Sm. The signals Dm and Sm from the memory 13 are supplied to the adder 14. In the adder 14 a preset value ΔD is added to the signal Dm upon receiving the signal Sm and generates the calculated a decimal signal Da indicative of the addition.

The comparator 15 receives the signals Dv and Da and makes a comparison therebetween. It supplies to the set terminal S of the flip-flop 7 a H level signal Se when the signal Dv is not smaller than the signal Da (Dv≧Da) or a L level signal Se when the signal Dv is smaller than the signal Da (Dv<Da).

With the thus constructed device according to the present invention, when the amount of reduction in the vehicle speed is greater than ΔD, the signal Se switches to H level, setting the circuit 7 to cause it to generate L level signal S$_{\overline{Q}}$. Therefore, the AND gate 5 provids L level signal even if the level of the lock-up signal S$_{L/U}$ remains in H level, thus releasing the torque converter from the lock-up state thereof.

This lock-up release operation is effected even when the period of the pulse train Sv increases rapidly due to circuit disconnection or short circuit within the electronic circuit.

It will now be understood that, with the lock-up control device according to the present invention, the lock-up of the torque converter is released during a rapid deceleration such as when vehicle speed drops at a rate larger than a predetermined degree even if the vehicle speed is still higher than the minimum lock-up vehicle speed. Therefore, the delay of the actual occurrence of the release of the lock-up from the switching of the level of the signal Se from L level to H level will not allow the vehicle speed to drop to such a low vehicle speed as to cause the engine to stall even if the vehicle is rapidly decelerated from the running state within the lock-up range. In other words, there is avoided the stalling of the engine due to the delay in lock-up upon such a rapid deceleration as to cause a light wheel lock.

Since the possibility of stalling of the engine has been eliminated, a brake system including a servo device operated by the engine intake manifold, a power steering system using as a working medium a working oil supplied by an oil pump that is driven by the engine and the like always work properly, preventing the occurrence of such a dangerous state as a drop in braking effectiveness and an increase in power steering effort, thus contributing to safe driving.

What is claimed is:

1. A lock-up control device for a lock-up type automatic transmission of a vehicle, the lock-up type automatic transmission including a lock-up clutch which is able to lock up, comprising:

means for generating a pulse train having a period which varies depending upon the vehicle speed;

means for allowing the lock-up clutch to lock up in response to said pulse train;

means for generating a period indicative signal indicative of a current period of said pulse train;

memory means for storing said period indicative signal and for generating a period indicative signal for a previously-stored period indicative signal for a preceding period of the pulse train; and means for preventing the lock-up clutch from locking up when a difference between said period indicative signal generated by said period indicative signal generating means and said period indicative signal generated by said memory means is larger than a preset value.

2. A lock-up control device as claimed in claim 1, wherein the period of said pulse train increases as the vehicle speed decreases.

3. A lock-up control device as claimed in claim 2, wherein said period indicative signal generating means includes a timer means for generating clock pulses and a counter means responsive to said pulse train and said clock pulses for counting said clock pulses and generating said period indicative signal.

4. A lock-up control device as claimed in claim 3, wherein said means for allowing the lock-up clutch to lock up includes means for generating a lock-up signal.

5. A lock-up control device as claimed in claim 4, wherein said means for preventing the lock-up clutch from locking up includes an adder means for adding said preset value to said period indicative signal generated by said memory means and generating an adder signal indicative the result of the addition, a comparator means for comparing said adder signal with said period indicative signal generated by said period indicative signal generating means and generating a comparator signal when said adder signal is larger than said period indicative signal generated by said period indicative signal generating means, a flip-flop means receiving said lock-up signal and said comparator signal for generating a flip-flop signal when said comparator signal occurs under the presence of said lock-up signal, a gate means receiving said lock-up signal and said flip-flop signal for generating a lock-up release signal in response to the occurrence of said flip-flop signal irrespective of the occurrence of said lock-up signal, and means for releasing the lock-up clutch from the lock-up state thereof in response to said lock-up release signal.

6. A lock-up control method for a lock-up type automatic transmission of a vehicle, the lock-up type automatic transmission including a lock-up clutch which is able to lock up, comprising the steps of:

generating a pulse train having period which varies depending upon the vehicle speed;

allowing the lock-up clutch to lock up in response to said pulse train;

generating a current period indicative signal indicative of a current period of said pulse train;

generating a preceding period indicative signal for a preceding period of the pulse train; and preventing the lock-up clutch from locking up when a difference between said current period indicative signal and said preceding period indicative signal is larger than a preset value.

7. A lock-up control device for a lock-up type atomatic transmission of a vehicle, the lock-up type automatic transmission including a lock-up clutch which is able to lock up, comprising:

means for generating a speed signal having a magnitude indicative of the speed of said vehicle;

means, responsive to said speed signal generating means, for determining a difference between the magnitude of said speed signal at a time $t_1$ and the magnitude of said speed signal at a time $t_2$, $t_2$ being later than $t_1$; and means, responsive to said difference determining means, for preventing the lock-up clutch from locking up when said difference is larger than a predetermined value.

8. A lock-up control device as claimed in claim 7 wherein said difference determining means further comprises means for storing an indication of said magnitude of said speed signal at time $t_1$.

9. A lock-up control method for a lock-up type automatic transmission of a vehicle, the lock-up type automatic transmission including a lock-up clutch which is able to lock up, comprising the steps of:

(a) generating a first speed signal having a magnitude indicative of the speed of said vehicle at a time $t_1$;

(b) storing said first speed signal;

(c) generating a second speed signal having a magnitude indicative of the speed of said vehicle at a time $t_2$;

(d) determining a difference between the magnitude of said generated second signal and said stored first signal; and (e) preventing said lock-up clutch from locking up when said difference exceeds a predetermined amount.

* * * * *